United States Patent
Ishikawa et al.

(10) Patent No.: US 7,111,133 B2
(45) Date of Patent: *Sep. 19, 2006

(54) CONTROL APPARATUS FOR SELECTIVELY OPERATING WITH PROGRAM DATA FROM TWO MEMORIES AND HAVING A SYSTEM CONTROLLER SUPPLYING PROGRAM DATA AND ADDRESS FOR WRITING THE DATA TO THE SECOND MEMORY

(75) Inventors: Yoshinori Ishikawa, Yokohama (JP); Yukinobu Tada, Yokohama (JP); Masato Soma, Yokohama (JP); Dan Aoki, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 401 days.

This patent is subject to a terminal disclaimer.

(21) Appl. No.: 10/720,147

(22) Filed: Nov. 25, 2003

(65) Prior Publication Data

US 2004/0078530 A1 Apr. 22, 2004

Related U.S. Application Data

(63) Continuation of application No. 09/935,769, filed on Aug. 24, 2001, now Pat. No. 6,665,237.

(30) Foreign Application Priority Data

May 18, 2001 (JP) ................. 1-148593

(51) Int. Cl.
*G06F 12/00* (2006.01)
*G06F 13/00* (2006.01)

(52) U.S. Cl. ............ 711/154; 711/2; 711/170; 711/202; 710/38; 710/40; 710/316

(58) Field of Classification Search ............ 369/44.11, 369/47.1; 711/4, 2, 102, 104, 154, 170, 202; 710/317, 38, 40, 316
See application file for complete search history.

(56) References Cited

U.S. PATENT DOCUMENTS 5,598,575 A * 1/1997 Dent et al. ................. 710/28
5,826,093 A  10/1998 Assouad et al.
5,835,101 A * 11/1998 Otsuka ...................... 345/539

FOREIGN PATENT DOCUMENTS

| EP | 0 653 698 A1 | 5/1995 |
| JP | 3-98119 | 4/1991 |
| JP | 4-251467 A | 9/1992 |
| JP | 4-373021 | 12/1992 |

(Continued)

*Primary Examiner*—Hong Kim
(74) *Attorney, Agent, or Firm*—McDermott Will & Emery LLP

(57) ABSTRACT

In a control apparatus for operating with program data, it is possible to alter the operation of a control circuit by rewriting the data of the program memory built in an LSI, with ease and at a low cost independently of the operation of the control circuit.

For that purpose, the control apparatus includes a ROM, a SRAM, a means for writing data in the SRAM, a selection means for selecting the output from the ROM or the SRAM in accordance with the addresses supplied to the ROM and the SRAM, and a control means for outputting the addresses to the ROM and the SRAM and operating with the output from the selection means as program data.

15 Claims, 7 Drawing Sheets

FOREIGN PATENT DOCUMENTS

| | | |
|---|---|---|
| JP | 5-158627 A | 6/1993 |
| JP | 7-182153 | 7/1995 |
| JP | 10-188292 | 7/1998 |
| JP | 2000-231452 A | 8/2000 |
| JP | 2000-242598 A | 9/2000 |
| JP | 2001-75798 | 3/2001 |

\* cited by examiner (PRIOR ART)

FIG.3

| DECIMAL ADDRESS | HEXADECIMAL ADDRESS | KIND OF PROGRAM DATA |
|---|---|---|
| 0 | 0 0 0 0 | ROM OUTPUT |
| 1 | 0 0 0 1 | |
| ⋮ | ⋮ | |
| 8 1 9 0 | 1 F F E | |
| 8 1 9 1 | 1 F F F | |
| 8 1 9 2 | 2 0 0 0 | SRAM OUTPUT |
| 8 1 9 3 | 2 0 0 1 | |
| ⋮ | ⋮ | |
| 8 7 0 2 | 2 1 F E | |
| 8 7 0 3 | 2 1 F F | |

CONTROL APPARATUS FOR SELECTIVELY OPERATING WITH PROGRAM DATA FROM TWO MEMORIES AND HAVING A SYSTEM CONTROLLER SUPPLYING PROGRAM DATA AND ADDRESS FOR WRITING THE DATA TO THE SECOND MEMORY

RELATED APPLICATION

This application is a continuation of U.S. patent application Ser. No. 09/935,769 filed Aug. 24, 2001, now U.S. Pat. No. 6,665,237 entitled "CONTROL APPARATUS AND OPTICAL DISC APPARATUS USING IT," commonly assigned to the assignee herein.

BACKGROUND OF THE INVENTION

The present invention relates to a control apparatus. In particular, the invention relates to a control apparatus operated with program data and enabling control sequence to be altered with ease and at a low cost.

Generally, in order to realize complicated sequence control all with a hardware configuration, an exclusive circuit for each sequence is needed, causing the cost to rise. Therefore, if a general-purpose control circuit is operated with software, and different types of sequence control use this control circuit in common, a rise of cost can be prevented.

For example, an optical disc apparatus is disclosed in JP-A-188292/1998. In this publication, when a focus jump for moving the focal point of a laser beam between the recording layers of a disk is made, a DSP (Digital Signal Processor) (hereinafter referred to as a control apparatus), which operates with the program stored in a ROM (Read Only Memory), detects the moving speed of an optical pickup. When the moving speed is zero, a focus jump is made. This can realize a stable focus jump. Thus, an optical disc apparatus needs, in addition to a focus jump, various types of sequence control including a track jump for moving the focal point of a laser beam between the tracks, and it is necessary to reduce the cost. This example will be described with reference to the block diagram shown in FIG. 2.

FIG. 2 is a block diagram of an optical disc apparatus, which includes a large-scale integration circuit (LSI) 1 and a system controller 6. The LSI 1 consists of a control circuit 2, a ROM 3, a parameter memory 4 and a servo circuit 5.

The control circuit 2 contains an accumulator and a timer, supplies program addresses to the ROM 3 and operates in accordance with the program data read from the ROM 3. The ROM 3 is a program memory in which program data is stored, and supplies the control circuit 2 with the program data according to the program addresses supplied from the control circuit 2. The control circuit 2 reads data from and writes data in the parameter memory 4, in which the parameters required for various types of sequence control are set up. The memories may be a SRAM (Static Random Access Memory) and a flip flop circuit. The servo circuit 5 is a servo block including an A/D converter, a compensation circuit, a D/A converter and a jump circuit. The A/D converter carries out analog-digital conversion of the focus error signals and the tracking error signals supplied from a head amplifier (not shown). The compensation circuit compensates a phase and a gain for the output from the A/D converter. The D/A converter carries out digital-analog conversion of the output signal from the compensation circuit. The jump circuit outputs a jump pulse. The servo circuit 5 is connected to the head amplifier and a driver (not shown) The system controller 6 sends a processing request to the control circuit 2, and receives from it a signal which indicates whether processing is completed or not.

The control circuit 2 is configured to operate in accordance with the program data output from the ROM 3, and the operation is programmable. The control circuit 2 constantly monitors a processing request from the system controller 6. If the system controller 6 outputs a processing request, the control circuit 2 operates in accordance with the request.

The sequence control of the servo circuit 5 is performed by the control circuit 2, which operates in accordance with the software stored in the ROM 3. This makes it possible to use a common hardware configuration even for different types of sequence control, thereby lowering the cost. The ROM 3 can reduce the manufacturing cost by using a mask ROM.

On the other hand, advanced semiconductor technology has made it possible to mount an analog circuit, a digital circuit, a memory circuit, etc. in a single LSI, making it possible to reduce the number of parts for the production of apparatus using LSIs and lower the electric power. However, if the ROM 3, which is a program memory, is mounted inside the LSI, the software cannot be rewritten. This cannot flexibly cope with problems on the sequence control and functional extension. If the software needs to be altered, the LSI must be remanufactured, which leads to an increase of a development term.

If the program memory is a SRAM, the software can be easily rewritten. However, this causes a cost rise because a SRAM is larger in circuit scale than a ROM.

Another ROM that can be rewritten is an EEPROM (Electrically Erasable Programmable Read Only Memory). However, it is difficult to manufacture SDRAMs (Synchronous Dynamic Random Access Memories) and EEPROMs in the same manufacturing process by using the present LSI manufacturing technology. Consequently, EEPROMs are not suitable for LSIs for specific use (ASIC: Application Specific IC), in many of which SDRAMs are mounted.

If an RISC (Reduce Instruction Set Computer) type microcomputer with a simple circuit configuration is used for the control circuit 2, it is necessary to read program data for every clock. In this case, since the access speed of an SDRAM is slow compared with a SRAM and a ROM, the SDRAM is not suitable as a program memory of the RISC type microcomputer.

For the reasons stated above, it was difficult to rewrite the data in the program memory contained in the LSI with ease and at a low cost.

On the other hand, JP-A-182153/1998 discloses another technology which can revise a program easily. The revised program stored in an external EEPROM is beforehand downloaded to a RAM. The program that needs changing uses the data stored in the RAM, while the program that does not need changing uses the data stored in the ROM.

In JP-A-182153/1995, however, the following points were not considered. When there are two or more sub routines to be altered, the program to be downloaded may be larger than the memory size of the RAM. The publication cannot cope with the case. If the system is configured to alter one sub routine to be revised to run and then to download another sub routine to be revised next, the control circuit cannot perform other processing while the sub routine after the second is being downloaded because the control circuit is compelled to concentrate on downloading.

In the optical disc apparatus, the control circuit may perform various types of regular processing while waiting for the processing request from the system controller. This lessens hardware configurations. For example, while the focus servo is operating regularly, it is monitored whether the absolute value of a focus error signal is less than a predetermined voltage or not. When the absolute value becomes more than the predetermined voltage, the state is judged out of focus, and then, the interruption signal that indicates the state out of focus is output to the system controller. In this case, the cost can be reduced because there is no need for an additional comparison circuit that compares the focus error signal with the predetermined voltage.

However, if the download processing needs to be performed while the focus servo is operating regularly, the control circuit cannot detect the above-mentioned out-of-focus state. Thus, if the control circuit is configured to perform the download processing while the optical disk apparatus is operating, it becomes inconvenient for the regular processing to be performed.

JP-A-098119/1991 discloses a method of altering program data by choosing the output data from a RAM if a program address is a predetermined address. This method needs an address comparison circuit, and a cost rise is caused if the address width is large. Moreover, since this is a method of replacing one word to be altered with one revised word, the method cannot cope with the addition and deletion of programs.

BRIEF SUMMARY OF THE INVENTION

In view of the above-mentioned problems, it is an object of the present invention to provide a control apparatus that enables the operation of control sequence to be altered by rewriting the data of the program memory built in an LSI, with ease and at a low cost independently of the operation of a control circuit.

A control apparatus according to the present invention operates with program data and comprises:

a first memory means that can read program data;

a second memory means that can write and read program data;

a writing means for writing data in the second memory means;

a selection means for selectively outputting the output from the first or second memory means; and a control means for outputting an address to the first or second memory means and operating with the output from the selection means as program data.

The selection means selects the output from the first or second memory means in accordance with the address. While control operation is performed with the program data from the first memory means, the writing means enables data to be written in the second memory means.

The control apparatus may further comprise a parameter memory means that can store a parameter therein. The selection means selects the output from the first or second memory means in accordance with the parameter.

The control means may include a read address generation means for generating an address for reading the first or second memory means. The read address generation means generates the address so as to select the output from the first or second memory means in accordance with the program data.

The read address generation means may generate the address so as to select the output from the first or second memory means in accordance with the parameter stored in the parameter memory means.

The writing means may include a write address generation means for generating an address to be written in the second memory means. In accordance with the output from the read address generation means, the writing means switches the output from the read address generation means and the output from the write address generation means, and then outputs the selected output to the second memory means.

A program may be configured to arbitrarily switch the output from the first memory means and the output from the second memory means as program data.

The first or second memory means may be a one-chip semiconductor element.

The second memory means may be a SRAM.

The first and second memory means, the writing means, the selection means and the control circuit may be contained in a one-chip semiconductor element.

An optical disk apparatus according to the present invention is used with the foregoing control apparatus and comprises:

a system controller for outputting a control command to the control apparatus;

a spindle motor for rotating an optical disc at a predetermined speed;

an object lens for condensing a laser beam on the recording side of the optical disc;

an optical pickup for outputting a signal according to the amount of the reflected light from the optical disc, the optical pickup including an actuator for moving a laser light source and/or the object lens; and a servo error signal generation circuit for generating a servo error signal by using the output signal from the optical pickup, and for supplying the servo error signal to the control apparatus.

Program data is downloaded from the system controller to the control apparatus, and the servo error signal is servo-controlled.

Other and further objects, features and advantages of the invention will appear more fully from the following description.

BRIEF DESCRIPTION OF THE SEVERAL VIEWS OF THE DRAWING

A preferred form of the present invention illustrated in the accompanying drawings in which:

FIG. 3 shows an embodiment of the memory space of this invention;

DESCRIPTION OF THE PREFERRED EMBODIMENTS

With reference to the block diagram of FIG. 1, a first embodiment of the control apparatus and the control method in this invention will be explained below.

Figure 1:
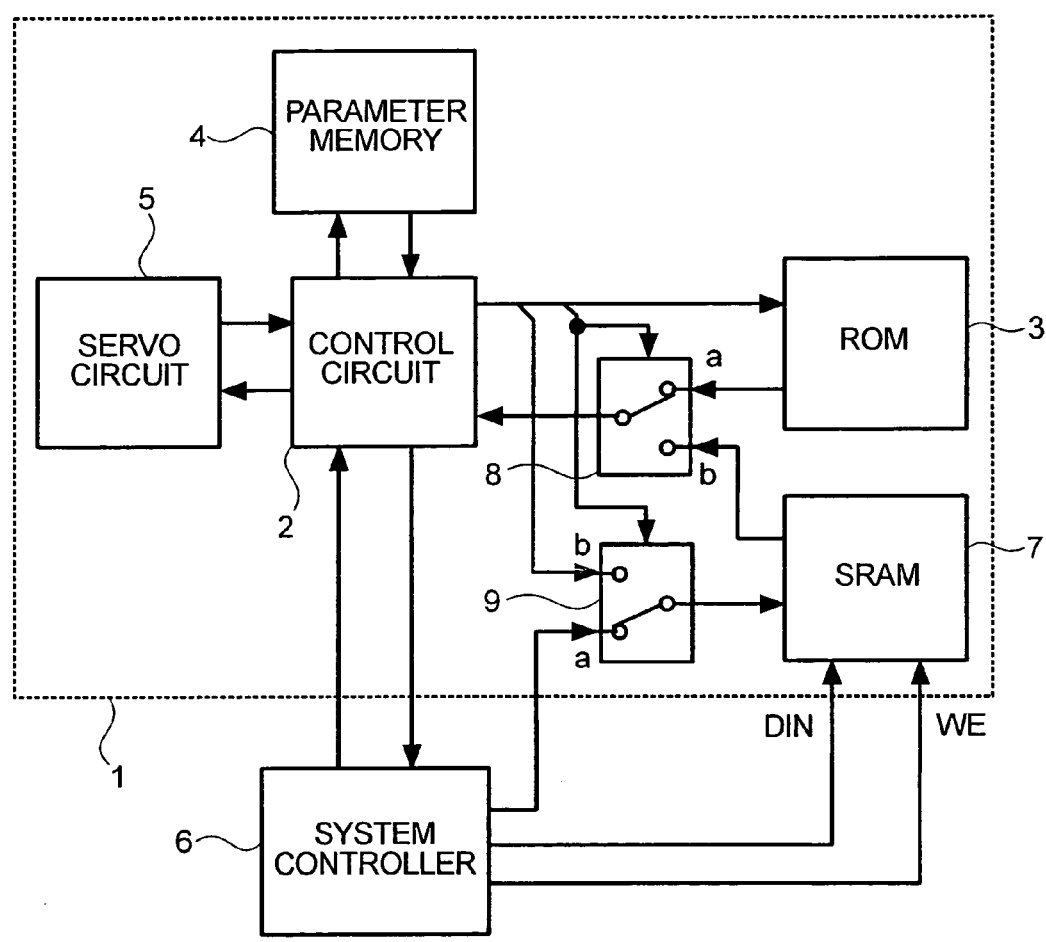
FIG. 1 is a block diagram showing an embodiment of the present invention.
Figure 2:
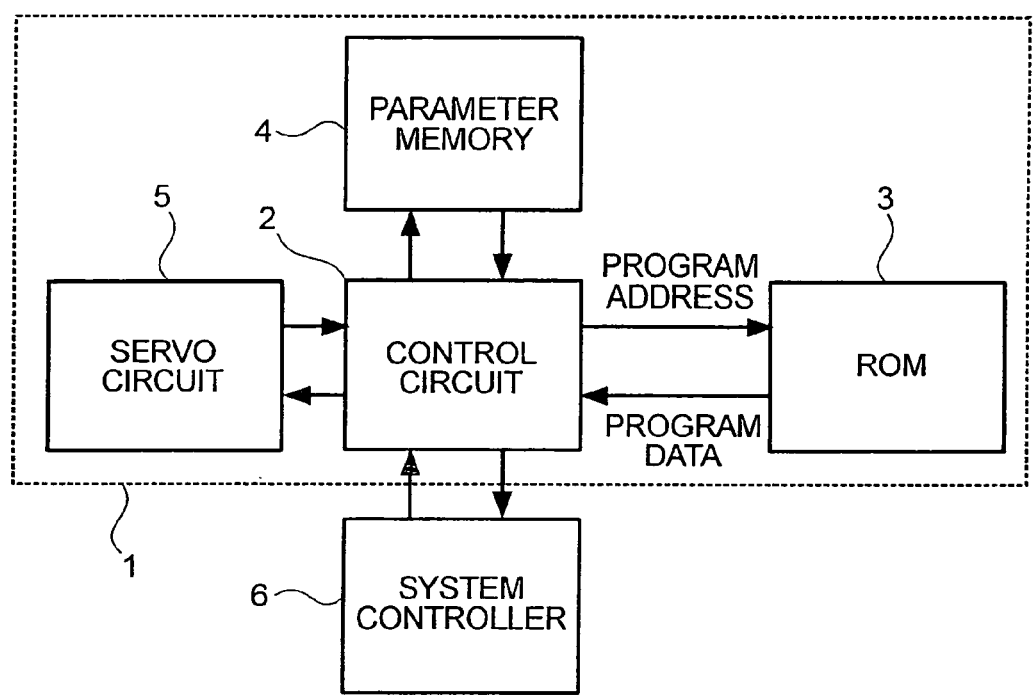
FIG. 2 is a block diagram of a prior art.

The control apparatus shown in FIG. 1 includes switch circuits 8 and 9. The other parts of FIG. 1 are similar to the parts of FIG. 2.

Program data is stored in the ROM 3, which supplies the input terminal a of the switch circuit 8 with the program data according to the program address supplied from control circuit 2. The program address output from the control circuit 2 is 14 bits. 13 bits of the low rank of the program address are input into the ROM 3. In other words, the memory space of the ROM 3 is $2^{13}$ words=8192 words.

The SRAM 7 is supplied with an address signal from the switch circuit 9, and with input data (DIN) and a write enable signal (WE) from the system controller 6. The output from the SRAM 7 is supplied to the input terminal b of the switch circuit 8.

The most significant bit of the program address output from the control circuit 2 is input as a control signal into the switch circuit 8. When the most significant bit is Low, the switch turns to 8-a and outputs the input data from the ROM 3. When the most significant bit is Hi, the switch turns to 8-b and outputs the input data from the SRAM 7. The output from the switch circuit 8 is supplied to the control circuit 2.

The most significant bit of the program address output from the control circuit 2 is input as a control signal into the switch circuit 9. When the most significant bit is Low, the switch turns to 9-a and outputs the download address signal supplied from the system controller 6. When the most significant bit is Hi, the switch turns to 9-b and outputs the program address supplied from the control circuit 2. The output from the switch circuit 9 is supplied to the address terminal of the SRAM 7. 9 bits of the low rank of the program address output from the control circuit 2 are input to the input terminal b. The download address input into the input terminal a is 9 bits. Therefore, the output of the switch circuit 9 is also 9 bits, and the memory space of the SRAM 7 is $2^9$ words=512 words.

The output data from the ROM 3 and the SRAM 7 are switched in the switch circuit 8 by the most significant bit of the 14 bits of the program address, and supplied to the control circuit 2. Therefore, at the program memory space, as shown in FIG. 3, when the decimal addresses range from 0 to 8,191, the output from the ROM 3 serves as program data, and when the decimal addresses range from 8,192 to 8,703 (512 words), the output from the SRAM 7 serves as program data.

Figure 4:
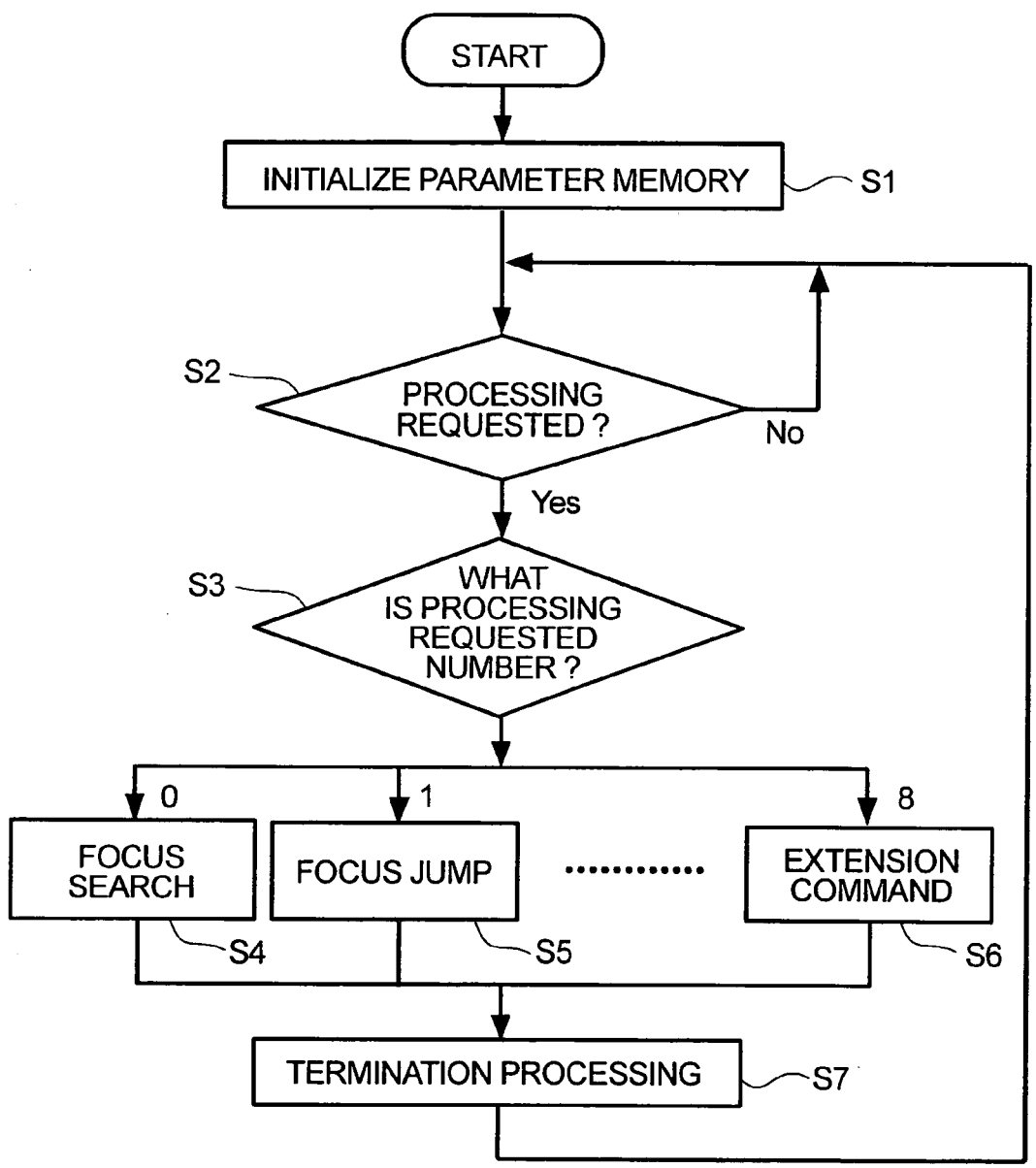
FIG. 4 is a flowchart of the main routine of the control circuit of this invention.

FIG. 4 is a flowchart of the main routine of the control circuit 2 after a time when the system is powered and reset. The control circuit 2 starts the program address with 0 and operates with the program data stored in the ROM 3. First, the control circuit 2 initializes the parameter memory (Step S1 of FIG. 4). Then, the control circuit 2 judges whether there is a processing request from the system controller 6 (Step S2 of FIG. 4). The program data stored in the ROM 3 is constituted so that the program address output from the control circuit 2 may range from 0 to 8,191 in the processing performed so far. Since the program address ranges from 0000 (HEX) to 1FFF (HEX) in hexadecimal notation at this time, the most significant bit of the 14 bits of the program address is Low. Therefore, the switch circuit 8 has turned to the side a and supplies the output data from the ROM 3 to the control circuit 2. Since the most significant bit of the program address is Low, the switch circuit 9 has also turned to the side a, and then the download address supplied from the system controller 6 is supplied to the address terminal of the SRAM 7. Therefore, the signals input to and output from the SRAM 7 are isolated completely from the control circuit 2.

In the above-mentioned state, controlling a download address, a DIN signal and a WE signal, the system controller 6 writes into the SRAM 7 and downloads words from 8,192 to 8,703 of the program data to the SRAM 7. As for the feature of this invention, while the control circuit 2 is operating in accordance with the program data from the ROM 3 as stated above, the SRAM 7 is separated from the servo control circuit, and therefore the system controller 6 can freely download the program to the SRAM 7.

The system controller 6 sends the number for a request for sequence processing such as a focus jump to the control circuit 2 after downloading to the SRAM 7 is completed. The control circuit 2 distinguishes the processing request number when there is a processing request at the Step S2 of FIG. 4 (Step S3 of FIG. 4). For example, if the processing request number from the system controller 6 is zero, the focal point of the laser beam is positioned on the recording side of the optical disc 1 by moving an optical pickup up and down. Then at this stage, the sequence processing (Focus Search) which closes the focal servo loop is performed (Step S4 of FIG. 4). If the processing request number is 1, a focus jump is made (Step S5 of FIG. 4). When the sequence processing is over, the control circuit 2 informs the system controller 6 of the end of the sequence processing (Step S7 of FIG. 4), and returns to the distinction of the processing request from the system controller 6 (Step S2 of FIG. 4).

The programs of the main routine and the various types of sequence processing are stored in the ROM 3. By running the programs, the control circuit 2 can perform the sequence control requested by the system controller 6.

A method of altering the routine of the focus jump processing (Step S5 of FIG. 4) will be explained below.

For example, in the case of a focus jump being made at the regular basis, the system controller 6 sends the processing number 1 to the control circuit 2, which then makes a focus jump at Step S6 of FIG. 4 as stated previously. The main routine is configured to perform the processing using the program data stored in the SRAM 7 as an extension command in case that the request number from the system controller 6 is 8. Then the system controller 6 downloads the previously altered program of the focus jump to the SRAM 7, and sends the processing number 8 to the control circuit 2. Thus the control circuit 2 makes a focus jump using the altered focus jump routine stored in the SRAM 7 at Step S6 of FIG. 4.

In other words, in the above-mentioned method, while the altered sequence control program is downloaded to the SRAM 7 beforehand, the program stored in the SRAM 7 operates a servo control circuit by giving the processing number regarded as an extension command to the control circuit 2.

In this embodiment, the system controller 6 downloads the program to be altered to the SRAM 7, and sends an extension command number. This can arbitrarily alter the sequence control routines easily. Since all programs are stored in the ROM 3 and only a sequence control routine to be altered is downloaded to the SRAM 7, it is possible to use a small capacity SRAM, lowering the cost.

A second embodiment of the control method in this invention will be explained below. Since the first and second embodiments are similar in structure, the structure of the second embodiment will not be described.

In the first embodiment, the sequence control routine to be altered is downloaded to the SRAM 7 beforehand. If the program data to be downloaded is larger than the memory space (512 words in this embodiment) of the SRAM 7, all of the required program data cannot be downloaded to the SRAM 7. If the memory space of the SRAM 7 has a sufficient size for each sequence control routine, the above-mentioned problems do not arise. But if the memory space of the SRAM 7 is made large, a cost rise will be caused.

Figure 5:
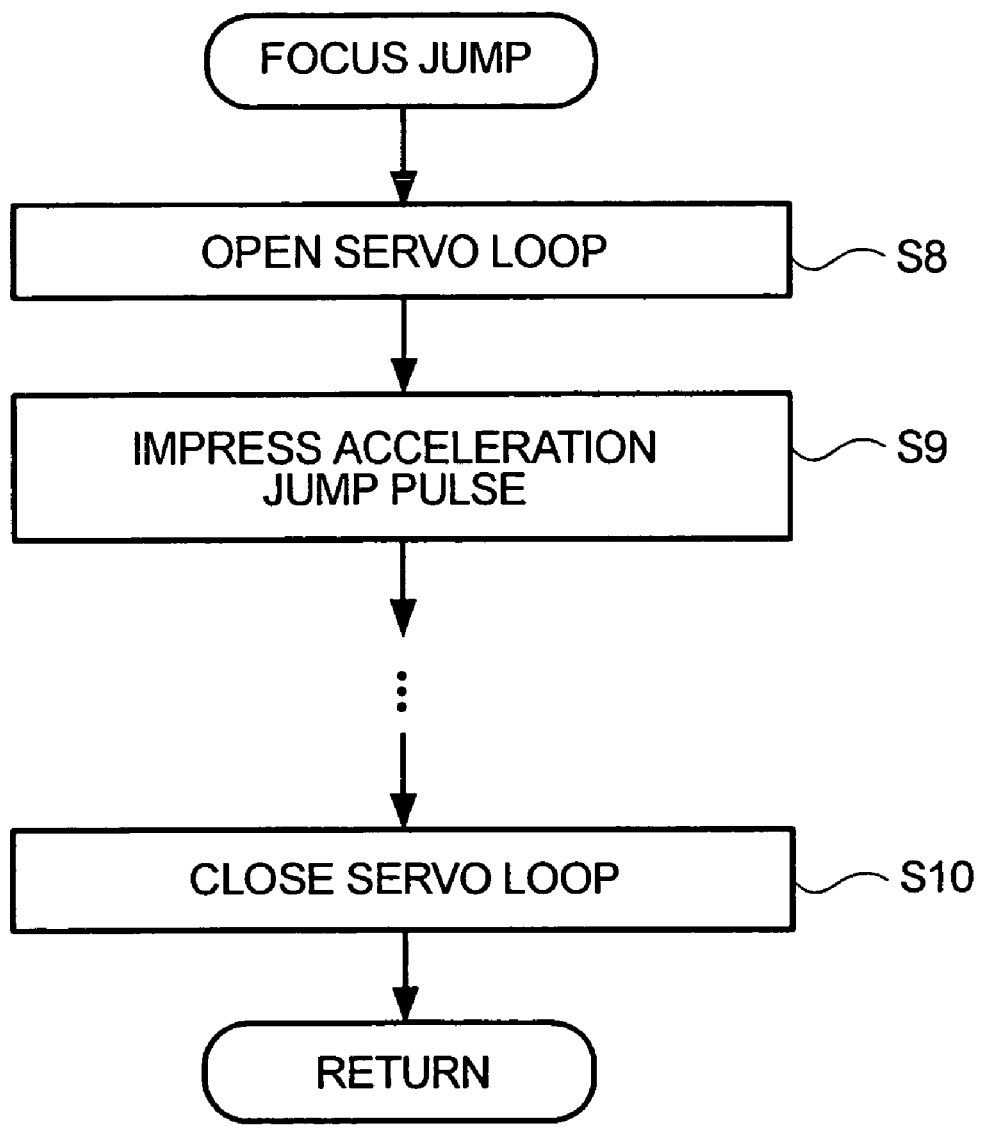
FIG. 5 is a first example showing the operation flowchart of the focus jump of this invention.

For example, the focus jump routine stored in the ROM 8 can be classified into small processes as shown in FIG. 5. These processes include the steps of opening a servo loop (Step S8 of FIG. 5), impressing an acceleration jump pulse (Step S9 of FIG. 6), and closing the servo loop (Step 10 of FIG. 5). If an alteration is required for only part of the steps, the memory space of the SRAM 7 can be small because the program data downloaded to the SRAM 7 is also small.

Figure 6:
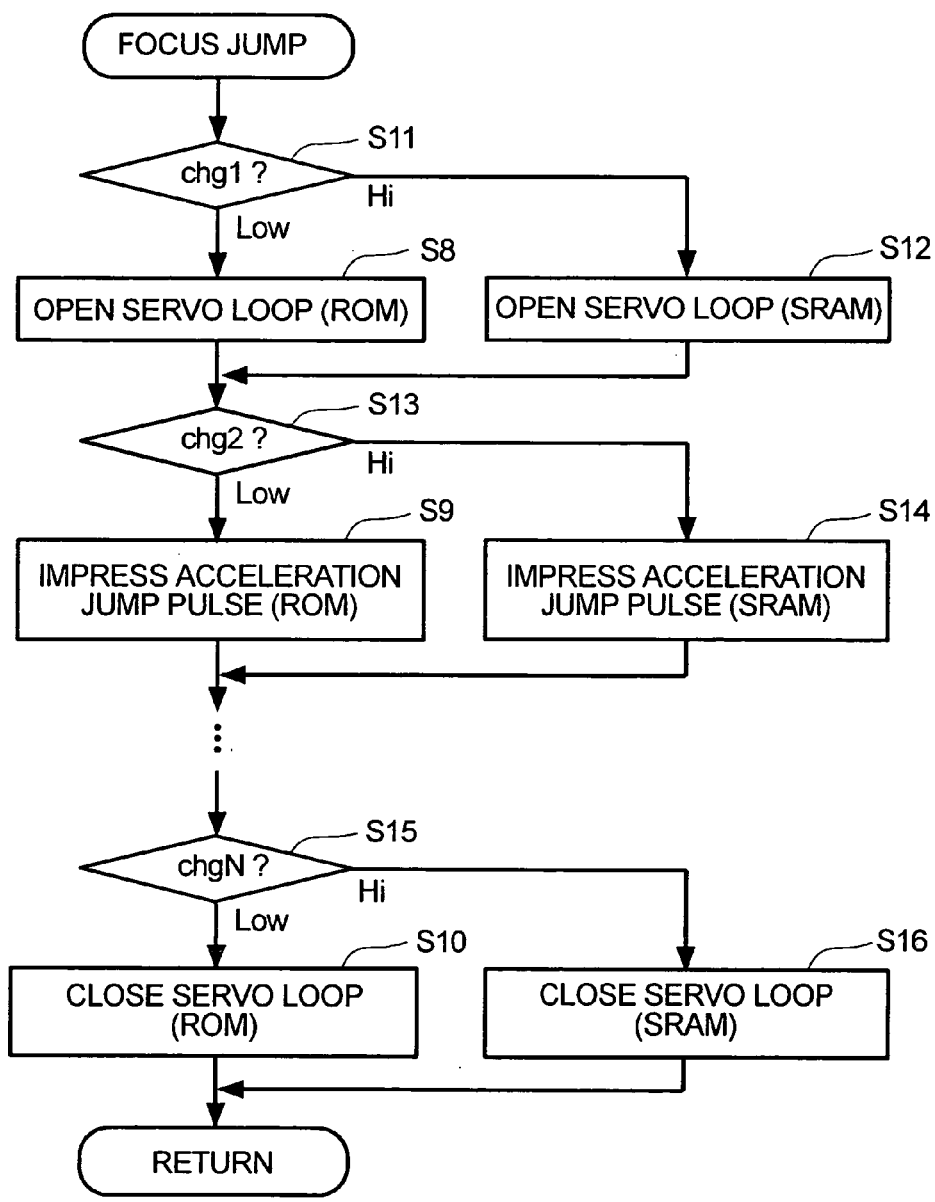
FIG. 6 is another example showing the operation flowchart of the focus jump of this invention.

In this embodiment, the routine shown in FIG. 5 is altered into the routine shown in FIG. 6. The difference between the routines shown in FIGS. 5 and 6 is that a flag judgment is made before each step. The system controller 6 sets this flag into the parameter memory 4 through the control circuit 2.

In FIG. 6, the focus jump routine reads the chg 1 flag set in the parameter memory 4, and then judges whether the process 1 should be performed using the program data in the SRAM 7 (Step S11 of FIG. 6). If the chg 1 flag is Low, the routine performs the process for opening a servo loop using the program data in the ROM 3 (Step S8 of FIG. 6). If the chg 1 flag is Hi, it performs the process for opening a servo loop using the program data in the SRAM 7 (Step S12 of FIG. 6). Similarly, the routine distinguishes the chg 2 flag before an acceleration jump pulse is impressed, and it distinguishes the chg N flag before the servo loop is closed. The routine switches the program data in the ROM 3 or the SRAM 7 based on the distinction to perform the process.

The focus jump routine described above is constituted as the program data of the ROM 3. Similarly to the first embodiment, the system controller 6 downloads the program data to be altered into the SRAM 7, while the control circuit 2 is operating in accordance with the program data of the ROM 3. The distinction flag is set Hi before the process for an alteration is performed. For example, to alter the acceleration jump pulse impression process (Step S9 of FIG. 8), a focus jump command is given to the control circuit 2 after the chg 2 flag of the parameter memory is set Hi. In this case, the control circuit 2 operates in accordance with the routine shown in FIG. 6, then processes an acceleration jump pulse impression using the program data of the SRAM 7 because the chg 2 flag is Hi by the judgment before the acceleration jump pulse impression (Step S13 of FIG. 6). This method makes it possible to alter the jump pulse impression process of the focus jump into the program data stored in the SRAM 7.

In the second embodiment, the sequence processing is divided into two or more processes, and then it is judged whether an alteration for each process is necessary before the process is performed. The program data of the ROM 3 or the SRAM 7 is switched based on the judgment, which enables part of the sequence control to be altered easily. Since it is not necessary to download all the routines of the sequence control, a small-capacity SRAM can be used, making the cost low.

In both of the first and second embodiments, the program for the alteration is downloaded to the SRAM. The program that does not need altering uses the data of the ROM, and the program that needs altering uses the program downloaded in the SRAM. Since downloading the program to the SRAM can be performed independently of the operation of the control circuit, the program can be downloaded to the SRAM at any timing.

In this invention, since the switch circuit switches the program data stored in the ROM and the SRAM in accordance with the program address, the program data downloaded to the SRAM can replace part of the program, making the operation of the sequence processing easy and the cost low.

Figure 7:
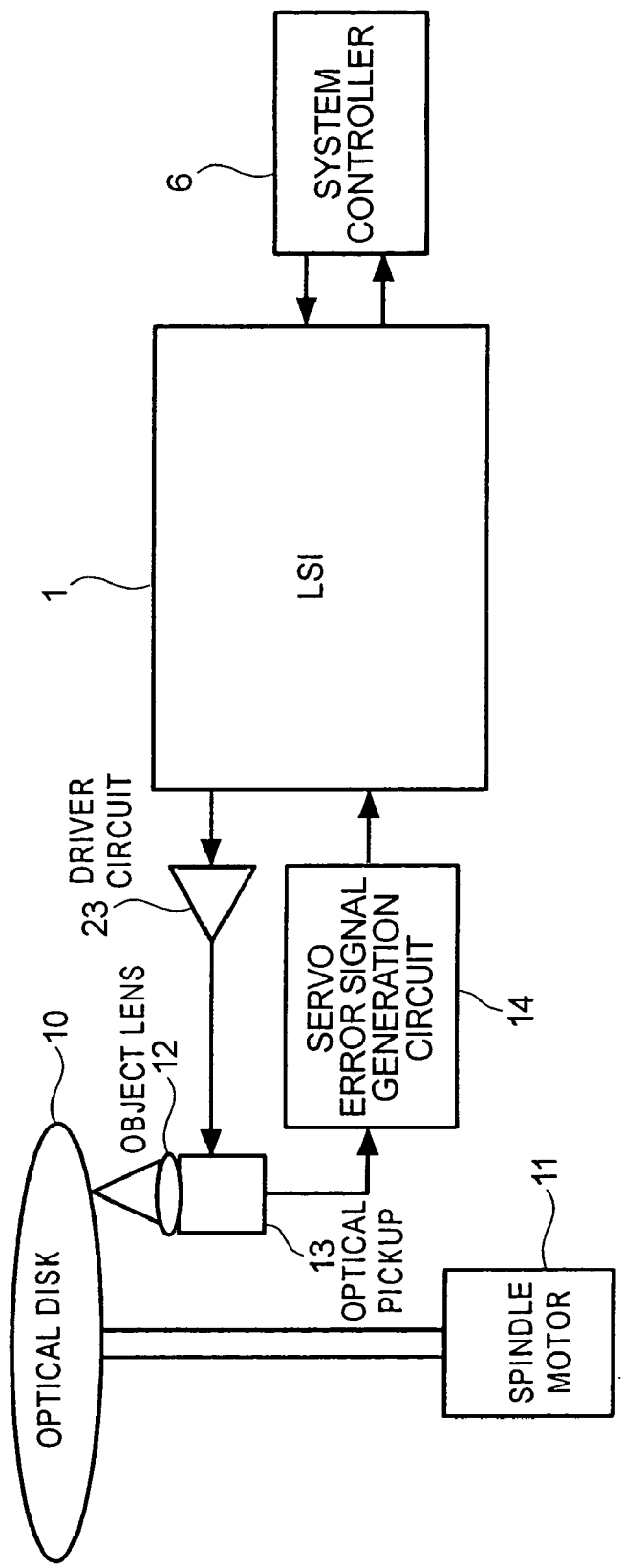
FIG. 7 is a block diagram of this invention as applied to an optical disc apparatus.

FIG. 7 shows the whole structure of an optical disc apparatus. This apparatus includes the LSI 1 and the system controller 6, which are shown in FIG. 1. The apparatus also includes a spindle motor 11, an object lens 12, an optical pickup 13, a servo error signal generation circuit 14 and a driver circuit 23.

With reference to FIG. 7, digital information is recorded on an optical disc 10 using the difference of the light reflectance caused by unevenness or phasic variation. The spindle motor 11 rotates the optical disc 10 at the predetermined rate. The object lens 12 condenses a laser beam on the recording side of the optical disc 10. The optical pickup 13 is equipped with an actuator which moves the laser light source and the object lens 12. The optical pickup 13 outputs a signal according to the amount of the reflected light from the optical disc 10. The actuator moves the position of the object lens according to the output signal from the driver circuit 23.

Using the output signal from the optical pickup 13, the servo error signal generation circuit 14 generates servo error signals including a focus error signal and a tracking error signal, which are supplied to the servo circuit 5 in the LSI 1. The driver circuit 23 amplifies the output signal from the servo circuit 5, and drives the actuator in the optical pickup 13.

As mentioned above, in FIG. 7, the program data stored in the ROM and the SRAM is switched, and the program data downloaded to the SRAM can replace part of the program. Then the sequence processing based on the program can be executed as the optical disk apparatus. This makes the operation of the sequence processing easy and the cost low. In FIG. 7, the LSI 1 and the system controller 6 are handled as different tips, but this invention may not be limited to the tips. A single tip may replace them.

In the embodiments of this invention, the control circuit controls the servo circuit, but this invention can be used to control not only a servo circuit but other circuits.

This invention makes it possible to provide a control apparatus that enables the operation of control sequence to be altered by rewriting the data of the program memory built in an LSI, with ease and at a low cost independently of the operation of a control circuit.

The foregoing invention has been described in terms of preferred embodiments. However, those skilled, in the art will recognize that many variations of such embodiments exist. Such variations are intended to be within the scope of the present invention and the appended claims.

The invention claimed is:

1. A control apparatus for operating with program data, the apparatus comprising:
    a first memory for storing program data;
    a second memory for storing program data;
    a writing means for writing data in the second memory;
    a first selection means for selectively outputting an output from one of the first and second memories;
    a control means for outputting a first address to one of the first and second memories and operating in accordance with program data output from the first selection means;
    the first selection means selecting the output from one of the first and second memories in accordance with the first address;

the writing means enabling data to be written in the second memory when the control means is operating in accordance with the program data from the first memory;

a system controller for outputting program data to the writing means and a second address for the second memory when the control means is operating in accordance with the program data from the first memory; and a second selection means for selectively outputting an address for the second memory from one of the control means and the system controller;

the second selection means selecting the second address form the system controller when the control means is operating in accordance with the program data from the first memory.

2. The control apparatus according to claim 1, wherein the control means includes a read address generation means for generating the first address for reading one of the first and second memories, the read address generation means generating the first address so as to select the output from one of the first and second memories in accordance with the program data.

3. The control apparatus according to claim 2, wherein the writing means includes a write address generation means for generating an address to be written in the second memory, the writing means switching the output from the read address generation means and the output from the write address generation means in accordance with the output from the read address generation means and outputting the selected output to the second memory.

4. The control apparatus according to claim 2, wherein the writing means includes a write address generation means for generating the second address to be written to in the second memory, the writing means selecting from between the first address and the second address in accordance with the first address and providing the selected address to the second memory.

5. The control apparatus according to claim 1, wherein a program is configured to arbitrarily switch the output from the first memory and the output from the second memory as program data.

6. The control apparatus according to claim 1, wherein one of the first and second memories is a one-chip semiconductor element.

7. The control apparatus according to claim 1, wherein the second memory is a SRAM.

8. A control apparatus for operating with program data, the apparatus comprising:
a first memory for storing program data;
a second memory for storing program data;
a writing means for writing data in the second memory;
a first selection means for selectively outputting an output from one of the first and second memories;
a control means for outputting a first address to one of the first and second memories and operating in accordance with program data output from the first selection means;
a parameter memory that can store a parameter therein;
the first selection means selecting the output from one of the first and second memories in accordance with the parameter;
the writing means enabling data to be written in the second memory when the control means is operating in accordance with the program data from the first memory;
a system controller for outputting program data to the writing means and a second address for the second memory when the control means is operating in accordance with program data from the first memory; and
a second selection means for selectively outputting an address for the second memory from one of the control means and the system controller;
the second selection means selecting the second address from the system controller when the control means is operating in accordance with the program data from the first memory.

9. The control apparatus according to claim 8, and further comprising a read address generation means for generating the first address for reading one of the first and second memories, the read address generation means generating the first address so as to select the output from one of the first and second memories in accordance with the parameter stored in the parameter memory.

10. The control apparatus according to claim 9, wherein the writing means includes a write address generation means for generating an address to be written in the second memory, the writing means switching the output from the read address generation means and the output from the write address generation means in accordance with the output from the read address generation means and outputting the selected output to the second memory.

11. The control apparatus according to claim 9, wherein the writing means includes a write address generation means for generating the second address to be written to in the second memory, the writing means selecting from between the first address and the second address in accordance with the first address and providing the selected address to the second memory.

12. The control apparatus according to claim 8 wherein a program is configured to arbitrarily switch the output from the first memory and the output from the second memory as program data.

13. The control apparatus according to claim 8, wherein one of the first and second memories is a one-chip semiconductor element.

14. The control apparatus according to claim 8, wherein the second memory is a SRAM.

15. A control apparatus for operating with program data, the apparatus including a one-chip semiconductor element comprising:
a first memory that is read only for storing program data;
a second memory that allows write and read, for storing program data;
a writing means for writing data in the second memory;
a first selection means for selectively outputting an output from one of the first and second memories;
a control circuit for control operation in accordance with the output from the first selection means;
the control apparatus enabling data to be written in the second memory while the control circuit is performing control operation in accordance with the program data from the first memory;
a system controller for outputting program data to the writing means and a second address for the second memory when the control circuit is operating in accordance with program data from the first memory; and
a second selection means for selectively outputting an address for the second memory from one of the control circuit and the system controller;
the second selection means selecting the second address from the system controller when the control circuit is operating in accordance with the program data from the first memory.

* * * * *